United States Patent
Starzewski et al.

Patent Number: 6,057,466
Date of Patent: May 2, 2000

[54] PALLADIUM CATALYSTS FOR POLYMERIZATION

[75] Inventors: Karl-Heinz Aleksander Ostoja Starzewski, Bad Vilbel; Uwe Denninger, Bergisch Gladbach, both of Germany

[73] Assignee: Bayer Aktiengesellschaft, Leverkusen, Germany

[21] Appl. No.: 08/939,178

[22] Filed: Sep. 29, 1997

[30] Foreign Application Priority Data

Oct. 17, 1996 [DE] Germany ............ 196 42 886

[51] Int. Cl.[7] .......................... C07F 15/00
[52] U.S. Cl. .................. 556/19; 556/13; 556/18; 556/20; 556/21; 556/22; 556/23; 556/69; 556/70; 556/137; 556/161; 556/171; 556/172
[58] Field of Search ............. 556/18, 19, 20, 556/21, 22, 23, 64, 70, 137, 13, 69

[56] References Cited

U.S. PATENT DOCUMENTS 5,155,188  10/1992  Goodall ...................... 526/165
5,175,326  12/1992  Klabunde ................. 556/138

FOREIGN PATENT DOCUMENTS 0 380 162 A3   8/1990   European Pat. Off. .
0380162A3      8/1990   European Pat. Off. .
0 445 755 A3   9/1991   European Pat. Off. .
0 608 903 A1   8/1994   European Pat. Off. .

OTHER PUBLICATIONS

Fryzuk et al., Can. J. Chem. 73 (1995) "Coordination chemistry of a mixed donor bidenate ligand with nickel," pp. 1175–1180.

Huheey, J., Inorganic Chemistry, Harper & Row, 1983, pp. 468–471.

Cherdron et al., Die Angewandte Makromolekulare Chemie 233 (1994) 121–133 (In German w/English Summary).

Rülke et al., Inorganica Chimica Acta. 169 (1990) 5–8.

Ladipo et al., Am.Chem.Soc., Organometallics, vol. 13, No. 1 (1994) 303–306.

Fryzuk et al., Can.J.Chem. 73 (1995) 1175–1180.

Graff et al., Recl.Trav.Chim.Pays–Bas 108 (1989) 275–277.

Andrieu et al., Synthesis and reactivity of aryl–and alkyl–palladium(II) complexes with functional phosphines and phosphinoenolate ligands: first analogues of model nickel catalysts, J. Chem. Soc., Dalton Trans., pp. 2903–2909, Jul. 1996.

Sembiring et al., Palladium(II) 2–diphenylphosphinohydroquinone complexes, J. Chem. Soc., Dalton Trans., pp. 3731–3741, 1995.

Huheey, J. E., Inorganic Chemistry, Harper & Row, 1983, pp. 468–470.

*Primary Examiner*—David W. Wu
*Assistant Examiner*—Roberto Rabago
*Attorney, Agent, or Firm*—Joseph C. Gill; Diderico van Eyl

[57] ABSTRACT

Compounds, for initiating the polymerization of ethylenically unsaturated compounds, having the formula

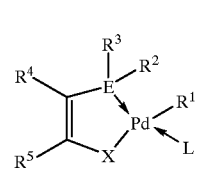

(I)

where
E is nitrogen, phosphorus, arsenic or antimony,
X is oxygen, $NR^1$ or sulphur,
L is $R^8R^9R^{10}E^1(Y)_n$, alkyl ether, ester, alkyl and aryl nitrites, pyridine, piperidine, sulphoxides, sulphones, sulphimides, sulphodiimides or sulphur ylides, and $R^1$–$R^5$ are as defined in the specification.

1 Claim, No Drawings

PALLADIUM CATALYSTS FOR POLYMERIZATION

The invention relates to new palladium catalysts and the use of palladium catalysts for the polymerization of ethylenically unsaturated compounds.

Polymers obtainable by polymerization of cycloolefins, in the presence or absence of acyclic olefins, have recently attracted interest because new optical applications place ever higher demands on the property profile of the thermoplastic to be used. Polycycloolefins are extraordinarily thermally stable and optically isotropic and also highly resistant to water and organic solvents.

Owing to their high optical transparency, low double refraction and high softening temperatures, cycloolefin homopolymers and copolymers are particularly suitable as raw materials for producing optical lenses and optical waveguides and also as information storage media, e.g. for compact discs.

Attempts have been made in the past, for example, to polymerize cycloolefins with the aid of Ziegler systems based on titanium compounds, vanadium compounds and metallocenes, cf. H. Cherdron et al., Angew. Makromol. Chem. 223 (1994), 121–133 and the literature cited therein. Since the diversity of structures and properties of the polycycloolefins obtained increases with the number of catalysts suitable for cycloolefin polymerization and the polycycloolefins known hitherto do not yet meet all expectations, there was a need for cycloolefin catalysts which are structurally different from the known cycloolefin catalysts.

EP-A-445 755 describes a process for the polymerization of cycloolefins of the norbornene type in the presence of a catalyst based on a transition metal of group Vb, VIb, VIb or VIII and an aluminoxane as cocatalyst. The preferred transition metals are nickel and palladium. The highest activity is shown by the catalyst system of Example 1 (23.6 kg of polymer/g of nickel, based on a polymerization time of 4 hours). For polymerization on an industrial scale, an improved activity would be desirable, particularly also in view of the expensive palladium catalysts.

WO/14048 discloses a process for the polymerization of cycloolefins wherein use is made as catalyst of a single-component or multicomponent catalyst system based on an ionic transition metal (VIII) compound and a chain transfer agent.

Although polymerization using these catalyst systems appears promising, the catalyst activities are too low for use on an industrial scale.

A further object of the invention is therefore to provide suitable catalysts having improved activity for the polymerization of cycloolefins.

It has now been found that selected palladium compounds are highly active catalysts for the polymerization of cycloolefins: the weight ratio of catalyst used to polymer produced becomes so low that recovery of the catalyst is no longer worthwhile and it can remain in the polymer.

The invention accordingly provides for the use of compounds of the formula

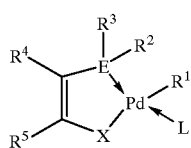

(I)

where

E is nitrogen, phosphorus, arsenic or antimony,

X is oxygen, $NR^1$ or sulphur, $R^1$, $R^2$, $R^3$ are, independently of one another, $C_1$–$C_{20}$-alkyl, $C_2$–$C_{30}$-alkenyl, $C_3$–$C_8$-cycloalkyl, $C_6$–$C_{12}$-aryl, $C_6$–$C_{12}$-ar-$C_1$–$C_{20}$-alkyl, $C_1$–$C_{20}$-alkyl-$C_6$–$C_{12}$-aryl, $C_1$–$C_{20}$-alkoxy, $C_6$–$C_{12}$-aryloxy, $C_1$–$C_{20}$-alkylamino, $C_6$–$C_{12}$-arylamino, $MSO_3$-$C_6$–$C_{12}$-aryl, $R^1$ may also be hydrogen and $R^1$ is preferably hydrogen, $C_1$–$C_{20}$-alkyl, $C_2$–$C_{30}$-alkenyl, $C_3$–$C_8$-cycloalkyl, $C_6$–$C_{12}$-aryl, $C_6$–$C_{12}$-ar-$C_1$–$C_{20}$-alkyl, $C_1$–$C_{20}$-alkyl-$C_6$–$C_{12}$-aryl, $R^4$, $R^5$ are, independently of one another, hydrogen, $C_1$–$C_{20}$-alkyl, $C_2$–$C_{30}$-alkenyl, $C_3$–$C_8$-cycloalkyl, $C_6$–$C_{12}$-aryl, $C_6$–$C_{12}$-ar-$C_1$–$C_{20}$-alkyl, $C_1$–$C_{20}$-alkyl-$C_6$–$C_{12}$-aryl, chlorine, $OR^6$, $COOR^6$, $COOM$, $CONR^6_2$, $COR^6$, $SR^6$, $SO_2R^6$, $OSO_2R^6$, $P(O)(OR^6)_{2-y}R^7_y$, $CN$, $NHR^6$, $NR^6_2$, $SO_3M$, $R^6$, $R^7$ are, independently of one another, hydrogen, $C_1$–$C_{20}$-alkyl, $C_2$–$C_{30}$-alkenyl, $C_3$–$C_8$-cycloalkyl, $C_6$–$C_{12}$-aryl, $C_6$–$C_{12}$-ar-$C_1$–$C_{20}$-alkyl, $C_1$–$C_{20}$-alkyl-$C_6$–$C_{12}$-aryl, y is zero, 1 or 2, M is 1 cation equivalent of, in particular, alkali metal, ½ alkaline earth metal, ammonium, phosphonium, thallium, $(C_1$–$C_{20}$-alkyl$)_4$ammonium, $(C_1$–$C_{20}$-alkyl$)_4$phosphonium, $(C_1$–$C_{20}$-alkyl$)_{4-z}(C_6$–$C_{12}$-aryl$)_z$phosphonium, $(C_1$–$C_{20}$-alkyl$)_{4-z}(C_6$–$C_{12}$-aryl$)_z$-ammonium, or ½ cation equivalent of an alkaline earth metal.

L is $R^8R^9R^{10}E^1(Y)_n$, alkyl ether, ester, alkyl and aryl nitriles, pyridine, piperidine, sulphoxides, sulphones, sulphimides, sulphodiimides or sulphur ylides, $E^1$ is as defined for E, $R^8$–$R^{10}$ are, independently of one another, hydrogen, $C_1$–$C_{20}$-alkyl, $C_2$–$C_{30}$-alkenyl, $C_3$–$C_8$-cycloalkyl, $C_6$–$C_{12}$-aryl, $C_6$–$C_{12}$-ar-$C_1$–$C_{20}$-alkyl, $C_1$–$C_{20}$-alkyl-$C_6$–$C_{12}$-aryl, $OR^{11}$, $NR^{11}_2$, $MSO_3$-$C_6$–$C_{12}$-aryl, $R^{11}$ is $C_1$–$C_{20}$-alkyl, $C_2$–$C_{30}$-alkenyl, $C_3$–$C_8$-cycloalkyl, $C_6$–$C_{12}$-aryl, $C_6$–$C_{12}$-ar-$C_1$–$C_{20}$-alkyl, $C_1$–$C_{20}$-alkyl-$C_6$–$C_{12}$-aryl, Y is $R^{12}R^{13}C$, $R^{12}N$, oxygen, sulphur, $=C=C=O$, $=C=C=S$, $=CPR^1R^2R^3$, $R^{12}$, $R^{13}$ are, independently of one another, $C_1$–$C_{20}$-alkyl, $C_2$–$C_{30}$-alkenyl, $C_3$–$C_8$-cycloalkyl, $C_6$–$C_{12}$-aryl, $C_6$–$C_{12}$-ar-$C_1$–$C_{20}$-alkyl, $C_1$–$C_{20}$-alkyl-$C_6$–$C_{12}$-aryl, z is zero or an integer from 1 to 4 and n is zero or preferably 1, as initiators for the polymerization of ethylenically unsaturated compounds, preferably for the polymerization and copolymerization of cycloolefins.

The term alkyl in the definitions of $R^1$ to $R^{13}$ represents straight-chain or branched alkyl having preferably from 1 to 12, particularly preferably from 1 to 6 and in particular from 1 to 4, carbon atoms. Examples which may be mentioned are methyl, ethyl, n-propyl, i-propyl, n-butyl, sec-butyl, i-butyl, t-butyl, n-pentyl, i-pentyl, t-pentyl, hexyl, i-octyl, n-decyl and n-dodecyl.

The term alkenyl in the definitions of $R^1$ to $R^{13}$ represents straight-chain or branched alkenyl having preferably from 2 to 18, particularly preferably from 2 to 12 and very particularly preferably from 2 to 6, carbon atoms. Examples which may be mentioned are vinyl, allyl, 2-propenyl, 1-butenyl, 2-butenyl, 3-butenyl, ethinyl, 1-propinyl, 2-propinyl, 1-butinyl, 2-butinyl, 3-butinyl, methallyl, crotyl and cinnamyl.

The term cycloalkyl in the radicals $R^1$ to $R^{13}$ represents cycloalkyl having preferably from 3 to 7, in particular 3, 5 or 6, carbon atoms. Examples which may be mentioned are unsubstituted or substituted cyclopropyl, cyclobutyl, cyclopentyl, cyclohexyl and cycloheptyl.

The term aryl in the radicals $R^1$ to $R^{13}$ represents unsubstituted or substituted aryl preferably having from 6 to 10 carbon atoms in the aryl part. Preferred examples include phenyl and naphthyl. The aryl groups can bear from 1 to 5 substituents selected from the group consisting of halogen (in particular chlorine and/or fluorine), $C_1$–$C_4$-alkoxy, cyano, nitro or amino. The term aryl also includes heteroaryl where heteroaryl represents heteroaryl which has from 1 to 5 carbon atoms and from 1 to 4 heteroatoms selected from the group consisting of oxygen, sulphur and nitrogen and may optionally be monosubstituted or polysubstituted by identical or different substituents and to which a 5- or 6-membered, saturated or unsaturated carbocycle may optionally be fused, where heteroaryl preferably represents pyridyl, pyrimidyl, pyrazinyl, quinolyl, isoquinolyl, pyrrolyl, indolyl, pyrazolyl, imidazolyl, benzimidazolyl, triazolyl, thienyl, benzothienyl, furyl, benzofuryl, thiazolyl, benzothiazolyl, isothiazolyl, oxazolyl, benzoxazolyl, isoxazolyl, thiadiazolyl, isothiadiazolyl, oxadiazolyl or isocadiazolyl each of which may optionally be monosubstituted to tetrasubstituted by identical or different substituents, where examples of heteroaryl substituents are: fluorinel chlorine bromine, iodine, cyano, nitro, hydroxy, mercapto, amino, straight-chain or branched alkoxy or straight-chain or branched alkylthio each having from 1 to 4 carbon atoms, straight-chain or branched halogenoalkoxy or straight-chain or branched halogenoalkylthio each having from 1 to 4 carbon atoms and from 1 to 9 fluorine and/or chlorine atoms, phenyl, phenoxy, phenylthio, phenyl-$C_1$–$C_2$-alkoxy or phenyl-$C_1$–$C_2$-alkylthio.

The term aralkyl in the radicals $R^1$ to $R^{13}$ represents compounds having preferably from 1 to 12, in particular from 1 to 6, carbon atoms in the straight-chain or branched alkyl part and preferably phenyl or naphthyl as aryl part. Examples of such aralkyl groups include benzyl, α-methylbenzyl, α,α-dimethyibenzyl, 2-phenylethyl, α- and β-naphthylmethyl. These aralkyl radicals may bear from 1 to 3 substituents selected from the group consisting of halogen (in particular chlorine and/or fluorine), nitro, cyano, optionally halogenated $C_1$–$C_4$-alkyl or -alkoxy such as methyl, ethyl, trifluoromethyl, difluorochloromethyl, difluoromethyl, trichloromethyl, methoxy, ethoxy, trifluoromethoxy, difluorochloromethoxy or difluoromethoxy, optionally halogenated $C_1$–$C_4$-alkylmercapto such as methylmercapto, trifluoromethylmercapto, difluorochloromethylmercapto.

The term alkylaryl in the radicals $R^1$ to $R^{13}$ represents the abovementioned aryl groups which in turn bear from 1 to 3 substituents selected from the group consisting of $C_1$–$C_4$-alkyl, halogeno-$C_1$–$C_2$-alkyl (such as trifluoromethyl, difluoromethyl).

The term alkoxy in the radicals $R^2$ and $R^3$ represents straight-chain or branched alkoxy having preferably from 1 to 6, in particular from 1 to 4, carbon atoms. Preferred examples include methoxy, ethoxy, n- and i-propoxy, n-, i-, sec- and tert-butoxy and also hexoxy.

The term aryloxy in the radicals $R^2$ and $R^3$ represents compounds preferably having from 1 to 10 carbon atoms in the aryl part. Preferred examples are phenoxy and naphthoxy. The aryloxy groups may be substituted by from 1 to 3 substituents selected from the group consisting of halogen (preferably chlorine and/or fluorine), $C_1$–$C_4$-alkyl, halogeno-$C_1$–$C_2$-alkyl (such as difluoroniethyl and trifluoromethyl), cyano, nitro or amino.

The term alkylamino in the radicals $R^2$ and $R^3$ represents monoalkylamino and dialkylamino radicals each preferably having from 1 to 4 carbon atoms in the respective straight-chain or branched alkyl parts, where in the case of dialkylamino the two radicals together with the nitrogen atom to which they are bound may optionally form a 5- or 6-membered, saturated ring which optionally contains an oxygen, sulphur or nitrogen atom and which may optionally be substituted by 1 or 2 methyl groups, or straight-chain or branched alkenyloxy or straight-chain or branched alkinyloxy each having from 3 to 4 carbon atoms. The term alkylamino thus includes, for example, methylamino and dimethylamino, ethylamino and di-ethylamino, n-propylamino and di-n-propyl amino, i-propylamino and di-i-propylamino, methylbutylamino, ethylbutylamino, pyrrolidino, piperidino, morpholino, thiomorpholino, N-methylpiperazino, 2,6-dimethylmorpholino.

The term arylamino in the radicals $R^2$ and $R^3$ represents

—NR$^{14}$R$^{15}$ where
$R^{14}$ represents hydrogen or $C_1$–$C_{12}$-alkyl, preferably hydrogen or methyl, and
$R^{15}$ represents aryl or heteroaryl preferably having from 3 to 10 carbon atoms, in particular
(i) phenyl which may optionally be monosubstituted to pentasubstituted by identical or different halogenoalkyl, halogenoalkoxy, halogenoalkylthio, halogenoalkylsulphinyl or halogenoalkylsulphonyl groups each having 1 or 2 carbon atoms and from 1 to 5 identical or different halogen atoms, by identical or different halogen, cyano, nitro, amino, hydroxy, carbamoyl and/or thiocarbamoyl groups or by doubly linked dioxyalkylene which has 1 or 2 carbon atoms and may optionally be monosubstituted to tetrasubstituted by halogen and/or halogenomethyl, where the oxygen atoms are not adjacent, for example unsubstituted phenyl itself or phenyl which is mono-substituted to tetrasubstituted by identical or different difluoromethyl, trifluoromethyl, trifluoroethyl, difluoromethoxy, trifluoromethoxy, difluorochloromethoxy, trifluoroethoxy, difluoromethylthio, difluorochloromethylthio, trifluoromethylthio, trifluoromethylsulphinyl, trifluoromethylsulphonyl, fluorine, chlorine, bromine, cyano, nitro, carbamoyl and/or thiocarbamoyl substituents or by a doubly linked radical of the formula —O—CH$_2$—O—, —O—CF$_2$—O—, —O—CH$_2$—CH$_2$—O—, —O—CFCl—CFCl—O—,

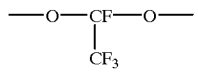

or

—O—CF$_2$—CF$_2$—O—; or (ii) heteroaryl having from 2 to 10 carbon atoms and from 1 to 4 heteroatoms selected from the group consisting of nitrogen, oxygen and sulphur, where these heteroaryl radicals may be monosubstituted to trisubstituted by identical or different halogenoalkyl, halogenoalkoxy, halogenoalkylthio, halogenoalkylsulphinyl or halogenoalkylsulphonyl groups each having 1 or 2 carbon atoms and from 1 to 5 identical or different halogen atoms, by identical or different halogen, cyano, nitro, amino, hydroxy, carbamoyl and/or thiocarbamoyl substituents, for example pyrrolidinyl, piperidinyl, furyl, thienyl, pyrazolyl, imidazolyl, 1,2,3- and 1,2,4-triazolyl, oxazolyl, isoxazolyl, thiazolyl, isothiazolyl, 1,2,3-, 1,3,4-, 1,2,4- and 1,2,5-oxadiazolyl, azepinyl, pyrrolyl, isopyrrolyl, pyridyl, piperazinyl, pyridazinyl, pyrimidinyl, pyrazinyl, 1,3,5-, 1,2,4-, 1,2,3-triazinyl, 1,2,4-, 1,3,2-, 1,3,6- and 1,2,6-oxazinyl, oxepinyl, thiepinyl, 1,2,4-diazepinyl, quinolyl, isoquinolyl, quinazolyl, quinoxalyl, cinnolyl, tetrazolyl, indolyl, indazolyl, benzimidazolyl, benzothienyl, benzofuryl, benzothiazolyl, benzoxazolyl, thiadiazolyl, isothiadiazolyl, oxadiazolyl and isoxadiazolyl and their substitution products.

The preferred arylamino is anilino.

Preferred alkyl ethers as ligands L include diethyl ether, dibutyl ether, methyl tert-butyl ether, tetrahydrofuran and dioxane.

Preferred esters as ligands L include esters of C$_1$–C$_8$-carboxylic acids with monohydric or dihydric C$_1$–C$_{18}$-alcohols, for example acetic, propionic and butyric esters of methanol, ethanol, propanol, butanol, hexanol, ethylene glycol, 1,4-butanediol.

Sulphoxides and sulphones suitable as ligands L include, for example, dimethyl sulphoxide, diethyl sulphoxide, diphenyl sulphoxide, dimethyl sulphone, diethyl sulphone, diphenyl sulphone.

Sulphimides and sulphoduimides suitable as ligands L include, for example, diphenylsulphimide, dimethylsulphimide, diethyl-(N-trimethylsilyl)-sulphimide, dimethylsulphodiimide.

Sulphur ylides suitable as ligands L include, for example, Me$_2$SCH$_2$, Me$_2$S(O)CH$_2$, Me$_2$SCHSiMe$_3$, Me$_2$S(O)CHSiMe$_3$, Ph$_2$S(O)CH$_2$, Ph$_2$S(O)CHSiMe$_3$, Me$_2$SCHCMeO, Me$_2$SCHCPhO, Me$_2$S(O)CHCPhO.

Alkyl and aryl nitriles suitable as ligands L include, for example, acetonitrile, propionitrile, butyronitrile and benzonitrile.

Preferred ligands L are those of the formula R$^8$R$^9$R$^{10}$E$^1$Y. Examples of such preferred ligands L include compounds of the formula

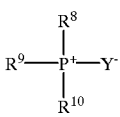

(I)

where

R$^8$, R$^9$ and R$^{10}$ are, independently of one another, customary substituents for organophosphorus compounds, specifically for P ylides, in particular straight-chain or branched C$_1$–C$_{20}$-alkyl radicals, C$_6$–C$_{12}$-aryl radicals, C$_2$–C$_{30}$-alkylene radicals, C$_3$–C$_8$-cycloalkyl radicals, C$_6$–C$_{12}$-aryl-C$_1$–C$_{20}$-alkyl radicals, C$_1$–C$_{20}$-alkyl-C$_6$–C$_{12}$-aryloxy radicals, C$_1$–C$_{20}$-alkylamino, C$_6$–C$_{12}$-arylamino, C$_1$–C$_{20}$-alkylphosphino, C$_6$–C$_{12}$-arylamino, C$_1$–C$_{20}$-alkylphosphino, C$_6$–C$_{12}$-arylphosphino and also the above hydrocarbon radicals substituted by, in particular, cyano, sulphonate, silyl, stannyl, halogen, hydroxy, amino, C$_1$–C$_{20}$-alkylamino, C$_6$–C$_{12}$-arylamino, nitro, C$_1$–C$_{20}$-alkylphosphino, C$_6$–C$_{12}$-arylphosphino, C$_1$–C$_{20}$-alkoxy or C$_6$–C$_{12}$-aryloxy, alkali metal, in particular lithium, or the radical —CO—R$^7$, where R$^7$ is hydrogen or is as defined under R$^8$ and where R$^9$ may be

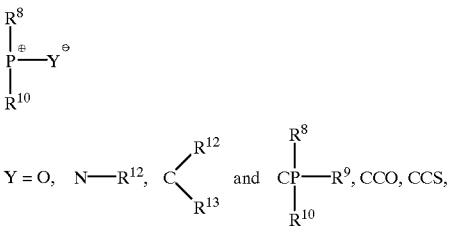

R$^{12}$ and R$^{13}$ are, independently of one another, hydrogen, a sulphonate radical, an alkali metal, in particular lithium, silyl radicals, stannyl radicals, phosphino radicals and boranyl radicals, acyl, halogen, cyano, a radical —CO—R$^7$ or a radical indicated under R$^1$, and where at least two of the radicals R$^1$ to R$^7$ can together be part of an isocyclic or heterocyclic ring, where, in particular, R$^5$ and R$^6$ together with the common carbon atom can form a saturated or unsaturated isocyclic or heterocyclic ring.

Preferably, R$^8$, R$^9$ and R$^{10}$ represent, independently of one another, phenyl or C$_1$–C$_6$-alkyl, in particular isopropyl, X represents CHR$^{12}$ and R$^{12}$ represents hydrogen or C$_1$–C$_6$-alkyl.

In a further preferred embodiment, preferred acyl radicals R$^{12}$ to R$^{13}$ are acetyl, formyl and benzoyl, carbomethoxy, carboethoxy.

In a further preferred embodiment, X represents CH$_2$, CH-phenyl, N-silyl and C(CN)$_2$, CH-vinyl, CH-propenyl and CH-styryl, and CH-acyl, in particular CH-formyl, CH-acetyl, CH-benzoyl, CH-carbomethoxy or C(acetyl)$_2$ and C(benzoyl)$_2$.

These ligands are joined to the palladium atom via the free electron pair of Y.

The invention further provides the compounds of the formula (I) in which n=1.

The palladium compounds (I) can be prepared from palladium starting compounds which have an easily replaceable ligand. Examples of such ligands are cyclooctadiene, dimethyl thioether, dimethoxyethane and tetramethylethylenediamine. Suitable palladium starting components are, for example, compounds of the formula LgPdClR$^1$ or their dimers, where Lg is the easily replaceable ligand, for example (cyclooctadiene)methylpalladium chloride or bis((dimethyl thioether)-methylpalladium chloride). These palladium starting compounds can be reacted in any order with approximately equimolar amounts of an alkali metal salt of the (thio)enol R$^2$R$^3$E—C(R$^4$)=C(R$^5$)—XH, e.g. the sodium salt of a phosphinoenolate, and approximately equimolar amounts of the ligand L. The reaction is preferably carried out in an inert organic solvent such as methylene chloride or toluene. The alkali metal halide formed in the reaction can be filtered off and the desired product (I) can be precipitated by addition of ether or hexane or be crystallized by partial removal of the solvent and cooling the remaining solution.

The palladium compounds (I) can be used as sole polymerization catalysts. However, it is frequently found that the concomitant use of cocatalysts gives an improved result.

Suitable cocatalysts are in principle compounds having an acid character (both Lewis and Brönstedt acids). Such acid compounds include, for example, organo-aluminium halides such as RAlCl$_2$, R$_2$AlCl, R$_3$Al$_2$Cl$_3$ (in each case R=C$_1$–C$_{20}$-, preferably C$_1$–C$_4$-alkyl). Preferred cocatalysts also include the compounds described in U.S. Pat. Specification No. 5,155,188 and having the formulae

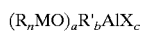
(R$_n$MO)$_a$R'$_b$AlX$_c$ or

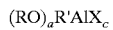
(RO)$_a$R'AlX$_c$ where

M is silicon, tin, germanium, lead or aluminium,

R, R' are, independently of one another, alkyl, alkylene, alkinyl, aryl, aralkyl, aralkylene or aralkinyl each having up to 18 carbon atoms, preferably C$_1$–C$_3$-alkyl or phenyl and, if M=Al, either R or R' is halogen, X is chlorine, fluorine, bromine or iodine, preferably chlorine, a is from 0.5 to 2.5, preferably from 1 to 0.75, b is from 0.25 to 2, preferably from 0.5 to 1, c is from zero to 2, preferably from 0.72 to 1.25, a+b+c=3, n is 2 (if M=Al) or 3.

Replacement of the groups (RO) by R$_3$SiO enables effective cocatalysts containing siloxy groups to be prepared.

Further preferred cocatalysts are aluminoxanes, i.e. 1:1 reaction products of organoaluminium compounds (other Al/water ratios are possible with water, e.g. partially hydrolysed trimethylaluminium, known as methylaluminoxane (MAO), of the formula

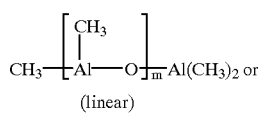
(linear)

-continued

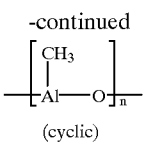
(cyclic)

where m=2–100 and n=3–30.

Activation is generally effected by introducing (usually bulky) weakly coordinating or non-coordinating anions into the ligand field of the central metal so that, taking a heuristic view, one coordination site is easily made free or is available for the interaction with the monomer to be polymerized.

The generation of such anions in the vicinity of the central metal is effected, for instance, by reaction with Bronstedt acids HX, where X can be, for example, trifluoromethylsulphonate. Other anions suitable as cocatalysts are, for instance, PF$_6^-$, SbF$_6^-$, SnCl$_3^-$ and perchlorate.

To introduce such anions, it is also possible to use salts of the respective anion, for example alkali metal, alkaline earth metal, thallium, silver, phosphonium and ammonium salts.

Further preferred cocatalysts include boron compounds of the type BR$_3$ such as tris-(pentafluorophenyl)-borane or of the type HBR$_4$ or MBR$_4$, where BR$_4$ is tetrafluoroborate, tetraphenylborate, tetrakis-(pentafluorophenyl)borate or tetraki s-[3,5-di-(trifluoromethyl)-phenyl]-borate.

Preference is also given to the salts of such borates cat$^+$BR$_4^-$ whose cations cat$^+$ are selected, for instance, from the group consisting of Na, K, Li, Mg, Ca, Ag, Tl, triphenylmethyl, N$^+$(C$_1$–C$_{12}$-alkyl)$_4$ and in particular N,N-dialkyl-anilinium ions.

Catalyst and cocatalyst can be added separately or together. During, the reaction, catalyst and cocatalyst can be present in the form of a complex. It is possible to form this complex in situ or to form it in a separate reaction and add it to the reaction in this pre-prepared form (in solution) or isolated (as solid).

Cycloolefins to be polymerized using the catalysts of the invention include all cycloolefins, for example cyclobutene, cyclopentene, cyclopentadiene, but also polycyclic cycloolefins such as dicyclopentadiene or those as are described, for example, in EP-A-608 903, i.e.

bicyclo-2-heptenes,
tricyclo-3-decenes,
tricyclo-3-undecenes,
tetracyclo-3-dodecenes,
pentacyclo-4-pentadecenes,
pentacyclopentadecadienes,
pentahydro-3-pentadecenes,
pentacyclo-4-hexadecenes,
pentacyclo-3-hexadecenes,
hexacyclo-4-heptadecenes,
heptacyclo-5-eicocenes,
heptacyclo-4-eicocenes,
heptacyclo-5-heneicocenes,
octacyclo-5-dococenes,
nonacyclo-5-pentacosenes,
nonacyclo-6-hexacosenes,
cyclopentadiene/acenaphthylene adducts,
1,4-methano-1.4.4a.9a-tetrahydrofluorenes and
1,4-methano-1.4.4a.5.10.10a-hexahydroanthracenes, such as
bicyclo[2.2.1]hept-2-ene,
6-methylbicyclo[2.2.1]hept-2-ene,
5,6-dimethylbicyclo[2.2.1]hept-2-ene,
1-methylbicyclo[2.2.1]hept-2-ene,
6-ethylbicyclo[2.2.1]hept-2-ene,
6-n-butylbicyclo[2.2.1]hept-2-ene,
6-isobutylbicyclo[2.2.1]hept-2-ene,
7-methylbicyclo[2.2.1]hept-2-ene,
ethylidene-norbornene,
vinyl-norbornene
tricyclo[4.3.0.1$^{2,5}$]-3-decene,
2-methyltricyclo[4.3.0.1$^{2,5}$]-3-decene,
5-methyltricyclo[4.3.0.1$^{2,5}$]-3-decene,
tricyclo[4.3.0.1$^{2,5}$]-3-undecene,
10-methyltricyclo[4.4.0.1$^{2,5}$]-3-undecene,
tetracyclo[4.4.0.1$^{2,5}$ $^{17,10}$]-3-dodecene,
8-methyltetracyclo[4.4.0.1$^{2,5}$ $^{17,10}$]-3-dodecene,
8-ethyltetracyclo[4.4.0.1$^{2,5}$ $^{17,10}$]-3-dodecene,
8-propyltetracyclo[4.4.0.1$^{2,5}$ $^{17,10}$]-3-dodecene,
8-butyltetracyclo[4.4.0.1$^{2,5}$ $^{17,10}$]-3-dodecene,
8-isobutyltetracyclo[4.4.0.1$^{2,5}$ $^{17,10}$]-3-dodecene,
8-hexatetracyclo[4.4.0.1$^{2,5}$ $^{17,10}$]-3-dodecene,
8-cyclohexyltetracyclo[4.4.0.1$^{2,5}$ $^{17,10}$]-3-dodecene,
8-stearyltetracyclo[4.4.0.1$^{2,5}$ $^{17,10}$]-3-dodecene,
5,10-dimethyltetracyclo[4.4.0.1$^{2,5}$ $^{17,10}$]-3-dodecene,
2,10-dimethyltetracyclo[4.4.0.1$^{2,5}$ $^{17,10}$]-3-dodecene,
8,9-dimethyltetracyclo[4.4.0.1$^{2,5}$ $^{17,10}$]-3-dodecene,
8-methyl-9-ethyltetracyclo[4.4.0.1$^{2,5}$ $^{17,10}$]-3-dodecene,
11,12-dimethyltetracyclo[4.4.0.1$^{2,5}$ $^{17,10}$]-3-dodecene,
2,7,9-trimethyltetracyclo[4.4.0.1$^{2,5}$ $^{17,10}$]-3-dodecene,
9-ethyl-2,7-dimethyltetracyclo[4.4.0.1$^{2,5}$ $^{17,10}$]-3-dodecene,
9-isobutyl-2,7-dimethyltetracyclo[4.4.0.1$^{2,5}$ $^{17,10}$]-3-dodecene,
9,11,12-trimethyltetracyclo[4.4.0.1$^{2,5}$ $^{17,10}$]-3-dodecene,
9-ethyl-11,12-dimethyltetracyclo[4.4.0.1$^{2,5}$ $^{17,10}$]-3-dodecene,
9-isobutyl-11,12-dimethyltetracyclo[4.4.0.1$^{2,5}$ $^{17,10}$]-3-dodecene,
5,8,9,10-tetramethyltetracyclo[4.4.0.1$^{2,5}$ $^{17,10}$]-3-dodecene,
8-ethylidenetetracyclo[4.4.0.1$^{2,5}$ $^{17,10}$]-3-dodecene,
8-ethylidene-9-methyltetracyclo[4.4.0.1$^{2,5}$ $^{17,10}$]-3-dodecene,
8-ethylidene-9-ethyltetracyclo[4.4.0.1$^{2,5}$ $^{17,10}$]-3-dodecene,
8-ethylidene-9-isopropyltetracyclo[4.4.0.1$^{2,5}$ $^{17,10}$]-3-dodecene,
8-ethylidene-8-butyltetracyclo[4.4.0.1$^{2,5}$ $^{17,10}$]-3-dodecene,
8-n-propylidenetetracyclo[4.4.0.1$^{2,5}$ $^{17,10}$]-3-dodecene,
8-n-propylidene-9-methyltetracyclo[4.4.0.1$^{2,5}$ $^{17,10}$]-3-dodecene,
8-n-propylidene-9-ethyltetracyclo[4.4.0.1$^{2,5}$ $^{17,10}$]-3-dodecene,
8-n-propylidene-9-isopropyltetracyclo[4.4.0.1$^{2,5}$ $^{17,10}$]-3-dodecene,
8-n-propylidene-9-butyltetracyclo[4.4.0.1$^{2,5}$ $^{17,10}$]-3-dodecene,
8-isopropylidenetetracyclo[4.4.0.1$^{2,5}$ $^{17,10}$]-3-dodecene,
8-isopropylidene-9-methyltetracyclo[4.4.0.1$^{2,5}$ $^{17,10}$]-3-dodecene,
8-isopropylidene-9-ethyltetracyclo[4.4.0.1$^{2,5}$ $^{17,10}$]-3-dodecene,
8-isopropylidene-9-isopropyltetracyclo[4.4.0.1$^{2,5}$ $^{17,10}$]-3-dodecene,
8-isopropylidene-9-butyltetracyclo[4.4.0.1$^{2,5}$ $^{17,10}$]-3-dodecene,
8-chlorotetracyclo[4.4.0.1$^{2,5}$ $^{17,10}$]-3-dodecene,
8-bromotetracyclo[4.4.0.1$^{2,5}$ $^{17,10}$]-3-dodecene,
8-fluorotetracyclo[4.4.0.1$^{2,5}$ $^{17,10}$]-3-dodecene,
8,9-dichlorotetracyclo[4.4.0.1$^{2,5}$ $^{17,10}$]-3-dodecene,
pentacyclo[6.5.1.1$^{3,6}$.0$^{2,7}$.0$^{9,13}$]-4-pentadecene,
1,3-dimethylpentacyclo[6.5.1.1$^{3,6}$.0$^{2,7}$.0$^{9,13}$]-4-pentadecene,
1,6-dimethyl[6.5.1.1$^{3,6}$.0$^{2,7}$.0$^{9,13}$]-4-pentadecene,
14,15-dimethyl[6.5.1.1$^{3,6}$.0$^{2,7}$.0$^{9,13}$]-4-pentadecene,
pentacyclo[7.4.0.1$^{2,5}$.1$^{9,12}$.0$^{8,13}$]-3-pentadecene,
methyl-substituted pentacyclo[7.4.0.1$^{2,5}$.1$^{9,12}$.0$^{8,13}$]-3-pentadecene,
pentacyclo[6.5.1.1$^{3,6}$.0$^{2,7}$.0$^{9,13}$]-4,10-pentadecediene,
pentacyclo[8.4.0.1$^{2,5}$.1$^{9,12}$.0$^{8,13}$]-3-hexadecene,
11-methylpentacyclo[8.4.0.1$^{2,5}$.1$^{9,12}$.0$^{8,13}$]-3-hexadecene,
11-ethyl[8.4.0.1$^{2,5}$.1$^{9,12}$.0$^{8,13}$]-3-hexadecene,
10,11-dimethyl[8.4.0.1$^{2,5}$.1$^{9,12}$.0$^{8,13}$]-3-hexadecene,
pentacyclo[6.6.1.1$^{3,6}$.0$^{2,7}$.0$^{9,14}$]-4-hexadecene,
1,3-dimethylpentacyclo[6.6.1.1$^{3,6}$.0$^{2,7}$.0$^{9,14}$]-4-hexadecene,
15,16-dimethylpentacyclo[6.6.1.1$^{3,6}$.0$^{2,7}$.0$^{9,14}$]-4-hexadecene,
hexacyclo[6.6.1.1$^{3,6}$.1$^{10,13}$.0$^{2,7}$.0$^{9,14}$]-4-heptadecene,
12-methylhexacyclo[6.6.1.1$^{3,6}$.1$^{10,13}$.0$^{2,7}$.0$^{9,14}$]-4-heptadecene,
12-ethylhexacyclo[6.6.1.1$^{3,6}$.1$^{10,13}$.0$^{2,7}$.0$^{9,14}$]-4-heptadecene,
12-isobutylhexacyclo[6.6.1.1$^{3,6}$.1$^{10,13}$.0$^{2,7}$.0$^{9,14}$]-4-heptadecene,
1,6,10-trimethylhexacyclo[6.6.1.1$^{3,6}$.1$^{10,13}$.0$^{2,7}$.0$^{9,14}$]-4-heptadecene,
heptacyclo[8.7.0.1$^{2,9}$.1$^{4,7}$.1$^{11,17}$.0$^{3,8}$.0$^{12,16}$]-5-eicosene,
heptacyclo[8.7.0.1$^{3,6}$.1$^{10,17}$.1$^{12,15}$.0$^{2,7}$.0$^{11,16}$]-4-eicosene and its dimethyl-substituted
derivatives,
heptacyclo[8.8.0.1$^{2,9}$.1$^{4,7}$.1$^{11,18}$.0$^{3,8}$.0$^{12,17}$]-5-heneicosene,
heptacyclo[8.8.0.1$^{4,7}$.1$^{11,18}$.1$^{13,16}$.0$^{3,8}$.0$^{12,17}$]-5-heneicosene and its trimethyl-substituted derivatives,
15-methylheptacyclo[8.8.0.1$^{4,7}$.1$^{11,18}$.1$^{13,16}$.0$^{3,8}$.0$^{12,17}$]-5-heneicosene,
5-methyl-bicyclo[2.2.1]-hept-2-ene,
5-$C_1$–$C_{20}$-alkyl-bicyclo[2.2.1]-hept-2-ene such as
5-ethyl-bicyclo[2.2.1]-hept-2-ene,
5-propyl-bicyclo[2.2.1]-hept-2-ene,
5-phenyl-bicyclo[2.2.1]hept-2-ene,
5-methyl-5-phenyl-bicyclo[2.2.1]hept-2-ene, 5-benzyl-bicyclo[2.2.1]hept-2-ene,
5-tolyl-bicyclo[2.2.1]hept-2-ene,
2-(ethylphenyl)-bicyclo[2.2.1]hept-2-ene,
5-(isopropylphenyl)-bicyclo[2.2.1]hept-2-ene,
5-biphenyl-bicyclo[2.2.1]hept-2-ene,
5-(β-naphthyl)-bicyclo[2.2.1]hept-2-ene,
5-(α-naphthyl)-bicyclo[2.2.1]hept-2-ene,
5-(anthracenyl)-bicyclo[2.2.1]hept-2-ene,
5,6-diphenyl-bicyclo[2.2.1]hept-2-ene,
1,4-methano-1.4.4a.9a-tetrahydrofluorene,
1,4-methano-1.4.4a.5.10.10a-hexahydroanthracene,
8-phenyltetracyclo[$4.4.0.1^{2,5}\ ^{17,10}$]-3-dodecene,
8-methyl-8-phenyltetracyclo[$4.4.0.1^{2,5}\ ^{17,10}$]-3-dodecene,
8-benzyl-tetracyclo[$4.4.0.1^{2,5}\ ^{17,10}$]-3-dodecene,
8-tolyl-tetracyclo[$4.4.0.1^{2,5}\ ^{17,10}$]-3-dodecene,
8-(ethylphenyl)-tetracyclo[$4.4.0.1^{2,5}\ ^{17,10}$]-3-dodecene
8-(isopropylphenyl)-tetracyclo[$4.4.0.1^{2,5}\ ^{17,10}$]-3-dodecene,
8,9-diphenyl-tetracyclo[$4.4.0.1^{2,5}\ ^{17,10}$]-3-dodecene,
8-(biphenyl)-tetracyclo[$4.4.0.1^{2,5}\ ^{17,10}$]-3-dodecene,
8-(β-naphthyl)-tetracyclo[$4.4.0.1^{2,5}\ ^{17,10}$]-3-dodecene,
8-(α-naphthyl)-tetracyclo[$4.4.0.1^{2,5}\ ^{17,10}$]-3-dodecene and
8-(anthracenyl)-tetracyclo[$4.4.0.1^{2,5}\ ^{17,10}$]-3-dodecene.

Preferred cycloolefins also include those which are substituted by halogen, —CN, $C_1$–$C_{20}$-alkyl, $C_1$–$C_{12}$-alkoxy or $C_0$–$C_{20}$-alkylene-COOC$_1$–$C_{20}$-alkyl and $C_0$–$C_{20}$-alkylene-O(O)C—$C_1$–$C_{20}$-alkyl, preferably by from one to three substituents per molecule.

The cycloolefins can also be polymerized in the presence of acyclic monoolefins or diolefins, alkines and carbon monoxide. Suitable acyclic olefins include $C_2$–$C_{40}$-α-olefins and $C_4$–$C_{24}$-diolefins, for example ethylene, propylene, 1-butene, 1-pentene, 1-hexene, 3-methyl-1-butene, 3-methyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, 1-eicosene and mixtures of these α-olefins and also 1,3-butadiene, isoprene, 1,4-pentadiene, 1,4- and 1,5-hexadiene, 1,6-heptadiene, 1,6- and 1,7-octadiene, 1,8-nonadiene, 1,9-decadiene, 1,11-dodecadiene, 1,19-eicodiene and mixtures of these diolefins. Also suitable are mixtures of α-olefins and diolefins.

Such olefins and diolefins can be further substituted, for example by phenyl, substituted phenyl, halogen, the esterified carboxyl group, the acid anhydride group; compounds of this type are, for example, chloroprene, styrene, methylstyrene, chlorostyrene, fluorostyrene, indene, 4-vinyl-biphenyl, vinylfluorene, vinylanthracene, methyl methacrylate, ethyl acrylate, vinylsilane, trimethylallylsilane, vinyl chloride, vinylidene chloride, tetrafluoroethylene, isobutylene, vinylcarbazole, vinylpyrrolidone, acrylonitrile, vinyl ethers and vinyl esters. Furthermore, ring-opening polyadditions, for instance of lactones such as ε-caprolactone or δ-valerolactone or of lactams such as ε-caprolactam are also possible according to the invention. Preferred monomers are: ethylene, propylene, butene, hexene, octene, 1,5-hexadiene, 1,6-octadiene, methyl methacrylate, ε-caprolactone, δ-valerolactone and acetylene.

For the preparation of polymers having good processability, it is advisable to copolymerize the cycloolefins with comonomers bearing long-chain substituents, by means of which the glass transition temperature can be lowered as required. Long-chain alkyl substituents, in particular those having from 8 to 20 carbon atoms, are preferred.

The catalysts and any cocatalysts can be used either as such in homogeneous form or individually or together in heterogeneous form on supports. The support material can here be of an inorganic or organic nature, for example silica gel, $Al_2O_3$, $MgCl_2$, cellulose derivatives, starch and polymers.

The polymerization can be carried out in solution, in a slurry or in bulk or in the gas phase. It is possible to carry it out continuously or batchwise. The catalyst can be initially charged and the monomer can be metered in. However, the monomer can also be initially charged and the catalyst can be metered in. It is likewise possible to initially charge catalyst and monomer or to introduce catalyst and monomer into the reaction zone in two separate streams.

The polymerization with the aid of the catalysts of the invention can be carried out in bulk or in solution, preferably with exclusion of water and oxygen. Organic solvents suitable for the polymerization in solution include aromatics such as toluene, chlorobenzene, nitrobenzene, halogenated aliphatics such as methylene chloride, tetrachloroethane and mixtures thereof.

In the case of a batch process, the catalysts of the invention can be used in amounts corresponding to a molar ratio of from $10^{-3}$ to $10^{-6}$, based on monomers to be polymerized. If cocatalysts are also to be used, the molar ratio of catalyst/cocatalyst is generally from 1 to $10^{-6}$, preferably from $10^{-1}$ to $10^{-4}$ for Al-containing cocatalysts and from $10^0$ to $10^{-1}$ for boron-containing cocatalysts.

The polymerizations can be carried out at temperatures of from 0 to 200° C., preferably from 20 to 160° C.

The polymers can be precipitated by non-solvents such as methanol or ethanol and then dried.

The catalysts I to be used according to the invention also catalyze the arylation and alkylation of olefins in the Heck reaction.

EXAMPLES

A. Synthesis of the palladium catalysts
1. Bis(ylide)palladium complexes
Preparation of [PdPh(Ph$_2$PCHCPhO)(Ph$_3$PCH$_2$)]

A solution of 0.52 g (1.59 mmol) of [Ph$_2$PCH=C(O)Ph]Na in THr is added to a solution of 0.68 g (1.59 mmol) of (TMEDA)Pd(Ph)I in THF and the mixture is stirred for 1 hour. A solution of 0.44 g (1.59 mmol) of Ph$_3$P=CH$_4$ in THF is subsequently added and the mixture is stirred for 3 hours. All solvent is removed under reduced pressure and the residue is extracted with toluene. The extract is evaporated under reduced pressure, admixed with ether and crystallized at 0° C. The resulting yellowish crystals are isolated and dried under reduced pressure. Yield: 0.63 g (52%).

$^1$H-NMR {400.1 MHz, CD$_2$Cl$_2$}: δ (ppm)=7.60 (m, 6H, Ph); 7.42 (m, 3H, Ph); 7.29 (m, 8H, Ph); 7.23–7.45 (m, 13H, Ph); 6.69 (m, 2H, Ph); 6.55 (m, 3H, Ph); 4.67 (s, 1H, CH); 1.72 (dd, 2H, $J_{PH}$=11.9 Hz, $J_{PH}$=7.6 Hz, CH$_2$); $^{31}$P{$^1$H}-NMR {161.9 MHz, CD$_2$Cl$_2$}: δ (ppm)=36.9, 23.0.

Preparation of [PdMe(Ph$_2$PCHCPhO)(Ph$_3$PCH$_2$)]

A suspension of 4.51 g (13.8 mmol) of [Ph$_2$PCH=C(O)Ph]Na in toluene is added to a suspension of 3.66 g (13.8 mmol) of (COD)Pd(Me)Cl in toluene. A yellow solution is immediately formed and this is stirred for 12 hours, after which a yellowish suspension has formed. This is admixed with a solution of 3.82 g (13.8 mmol) of Ph$_3$P=CH$_2$ in toluene and the mixture is stirred for from 2 to 3 hours. All volatile constituents are subsequently removed under reduced pressure and the residue is extracted with warm methylene chloride. The resulting extract is evaporated under reduced pressure, admixed with ether and crystallized by cooling to −20° C. The resulting dirty white crystals are isolated and dried under reduced pressure. The mother liquor is evaporated to dryness, again taken up in a little methylene chloride, admixed with ether and crystallized at −20° C. The resulting crystals are worked up as above. Yield: 7.27 g (76%).

$^1$H-NMR {400.1 MHz, CD$_2$Cl$_2$}: δ (ppm)=7.91–7.20 (m, 30H, Ph); 4.79 (s, 1H, CH); 1.66 (dd, 2H, J$_{PH}$=12.3 Hz, J$_{PH}$=7.6 Hz, CH$_2$); −0.17 (d, 3H, J$_{PH}$=4.9 Hz, Me); $^{13}$C{$^1$H}-NMR {100.6 MHz, CD$_2$Cl$_2$}:δ (ppm)=18.26 (d, J$_{PC}$=22 Hz, CO); 140.8 (d, J$_{PC}$=15 Hz, Ph); 138.3 (s, Ph); 137.9 (s, PH); 133.7 (d, J$_{PC}$=10 Hz, Ph); 132.5 (d, J$_{PC}$=12 Hz, Ph); 132.3 (d, J$_{PC}$=3 Hz, Ph); 128.9 (d, J$_{PC}$=2 Hz, Ph); 128.7 (d, J$_{PC}$=12 Hz, Ph); 128.1 (d, J$_{PC}$=10 Hz, Ph); 128.1 (s, Ph); 127.4 (s, Ph); 127.2 (s, Ph); 75.5 (d, J$_{PC}$=56 Hz, CH); 0.6 (dd, J$_{PC}$=29 Hz, J$_{PC}$=94 Hz, CH$_2$); −11.2 (d, J$_{PC}$=6 Hz, Me); $^{31}$P{$^1$H}-NMR {161.9 MHz, CD$_2$Cl$_2$}: δ (ppm)=34.6, 23.9.

2. Ylide-phosphine-palladium complexes

Preparation of [PdPh(Ph$_2$PCHCPhO)(Ph$_3$P)]

A solution of 0.40 g (1.24 mmol) of [Ph$_2$PCH=C(O)Ph]Na in methylene chloride is added to a solution of 0.53 g (1.25 mmol) of (TMEDA)Pd(Ph)I in methylene chloride. After about one hour, a milky yellow suspension is obtained and this is filtered through kieselguhr. The filtrate is subsequently admixed with 0.33 g (1.24 mmol) of triphenylphosphine and stirred for a further hour. All volatile constituents are removed under reduced pressure and the residue is extracted with toluene and filtered. The filtrate is evaporated under reduced pressure and admixed with hexane. This results in formation of a yellowish precipitate. To complete the precipitation, the mixture is left to stand at 0° C. The precipitate is subsequently isolated, washed with hexane and dried under reduced pressure. Yield: 0.78 g (87%).

$^1$H-NMR {400.1 MHz, CD$_2$Cl$_2$}: δ (ppm) =7.56 (m, 2H, Ph); 7.43–7.13 (m, 28H, Ph); 6.64 (d, 2H, J$_{HH}$=6.7 Hz, Ph); 6.54 (m, 1H, Ph); 6.43 (t, 2H, J$_{HH}$=7.5 Hz, Ph); 4.87 (br s, 1H, CH); $^{31}$P{$^1$H}-NMR {161.9 MHz, CD$_2$Cl$_2$}: δ (ppm)= 23.4 (AB system); 20.1 (AB system).

Preparation of [PdMe(Ph$_2$PCHCPhO)(Ph$_3$P)]

A solution of 3.89 g (10.8 mmol) of [Ph$_2$PCH=C(O)Ph]Na in toluene is slowly added to a suspension of 3.52 g (10.8 mmol) of [(PPh$_3$)Pd(Me)Cl]$_2$ in toluene. A yellow suspension is formed and this is stirred for 4 hours. The suspension is filtered through kieselguhr and the solvent is removed under reduced pressure. The residue is again taken up in toluene and filtered. The solvent is removed under reduced pressure and the residue is washed with hexane and ether. Yield: 3.98 g (54%).

$^1$H-NMR {400.1 MHz, CD$_2$Cl$_2$}: δ (ppm)=7.68–7.60 (m, 12H, Ph); 7.41–7.27 (m, 15H, Ph); 7.20–7.16 (mm, 3H, Ph); 4.83 (dd, 1H, J$_{HP}$=4.6, J$_{HP}$=0.8 Hz, CH); 0.16 (dd, 3H, J$_{HP}$=4.4 Hz, Me); $^{31}$P{$^1$H}-NMR {161.9 MHz, CD$_2$Cl$_2$}: δ (ppm)=28.5 (AB system); 24.2 (AB system).

Preparation of [PdMe(Ph$_2$PCHCPhO)(Et$_3$P)]

Using a method similar to that for [PdMe(Ph$_2$PCHCPhO)(Ph$_3$P)], [PdMe(Ph$_2$PCHCPhO)(Et$_3$P)] is obtained from 1.48 g (5.38 mmol) of [(Pet$_3$)Pd(Me)Cl]$_2$ and 1.76 g (5.38 mmol) of [Ph$_2$PCH=C(O)Ph]Na in a yield of 46% (1.34 g).

$^1$H-NMR {400.1 MHz, CD$_2$Cl$_2$}: δ (ppm)=777–7.75 (m, 12H, Ph); 7.58–7.53 (m, 4H, Ph); 7.31–7.27 (m, 6H, Ph); 7.23–7.30 (m, 3H, Ph); 4.81 (d, 1H, J$_{HP}$=4.3 Hz, CH); 1.78 (dquint, 6H, J$_{HP}$=JHH=7.6 Hz, J$_{HP}$=1.5 Hz, CH$_2$); 1.14 (ddt, 9H, J$_{HP}$=15.0 Hz, J$_{HP}$=1.1 Hz, CH$_3$-Et); 0.24 (dd, 3H, J$_{HP}$=5.3 Hz, J$_{HP}$=5.2 Hz, CH$_3$Pd); $^{31}$P{$^1$H}-NMR {161.9 MHz, CD$_2$Cl$_2$}: δ (ppm)=28.0 (AB system); 18.4 (AB system).

3. Ylide-imine-palladium complexes

Preparation of [PdMe(Ph$_2$PCHCPhO)(Ph$_3$PNH)]

Using a method similar to that for [PdMe(Ph$_2$PCHCPhO)(Ph$_2$PCH$_2$)], [PdMe(Ph$_2$PCHC(O)Ph(Ph$_3$PNH)] is obtained from 1.42 g, (5.58 mmol) of (COD)Pd(Me)Cl, 1.82 g (5.58 mmol) of [Ph$_2$PCH=C(O)Ph]Na and 2.58g (5.58 mmol) of Ph$_3$P=NH in a yield of 73% (2.83 g).

$^1$H-NMR {400.1 MHz, CD$_2$Cl$_2$}: δ (ppm)=7.90 (m, 6H, Ph); 7.51 (m, 7H, Ph); 7.37 (m, 6H, Ph); 7.27 (m, 8H, Ph); 7.09 (m, 1H, Ph); 7.03 (m, 2H, Ph); 4.56 (d, $^1$H, J$_{PH}$32 2.0 Hz, CH); 1.19 (br s, 1H, NH); 0.00 (d, 3H, J$_{PH}$=2.1 Hz, Me); $^{31}$P{$^1$H}-NMR {161.9 MHz, CD$_2$Cl$_2$}: δ (ppm)=34.3 (d, J$_{PP}$=13 Hz); 32.4 (d).

4. Ylide-pyridine-palladium complexes

Preparation of [PdMe(Ph$_2$PCHCPhO)(C$_5$H$_5$N)]

Using a method similar to that for [PdMe(Ph$_2$PCHCPhO)(Ph$_3$PCH$_2$)], [PdMe(Ph$_2$PCHCPhO)(C$_5$H$_5$N)] is obtained from 1.00 (3.77 mmol) of (COD)Pd(Me)Cl, 1.32 g (3.77 mol) of [Ph$_2$PCH=C(O)Ph]Na and 0.30 ml (298 mg, 3.77 mmol) of pyridine in a yield of 48% (920 mg).

$^1$H-NMR {400.1 MHz, CD$_2$Cl$_2$}: δ (ppm)=8.88 (d, 2H, J$_{HH}$32 4.6 Hz, o-H-py); 7.80 (m, 3H, p-H-Py and PH); 7.63 (m, 4H, Ph); 7.42 (m, 2H, Ph); 7.33 (m, 6H, Ph); 7.23 (m, 3H, m-H-Py and PH); 4.73 (d, 1H, J$_{PH}$=1.7 Hz, CH); 0.36 (s, 3H, Me); $^{31}$P{$^1$H}-NMR {161.9 MHz, CD$_2$Cl$_2$}: δ (ppm)=33.7.

5. Catalyst precursors

Preparation of [(COD)Pd(Me)Cl]

12.0 ml (97.8 mmol) of 1,5-COD is added to a solution of 12.0 g (40.8 mmol) of Na$_2$PdCl$_4$ in methanol, the mixture is stirred for 12 hours, the resulting yellow solid is filtered off and washed with methanol. The product is suspended in a mixture of methylene chloride/methanol (1:1), admixed with 6.8 ml (48.9 mmol) of SnMe$_4$ and the mixture is stirred for 3 hours. All volatile constituents are subsequently removed under reduced pressure and the residue is extracted with ether. The residue which then remains is recrystallized from methylene chloride/ether. Yield: 7.71 g (71%).

References: P. W. N. M. van Leeuwen, C. F. Roobeek, EP-A 380162 (1990); R. E. Rulke, I. M. Han, C. J. Elsevier, P. W. N. M. van Leeuwen, C. F. Roobeek, M. C. Zoutberg, Y. F. Wang, C. H. Stam, Inorg. Chim. Acta (1990) 169, 5.

Preparation of $[(Ph_3P)Pd(Me)Cl]_2$ 2.93 g (11.2 mmol) of triphenylphosphine are added to a solution of 2.96 g (11.2 mmol) of $(COD)Pd(Me)Cl$ in toluene and the mixture is stirred for 3 hours. The precipitate formed is subsequently filtered off, washed with toluene and hexane and dried under reduced pressure. Yield: 3.89 g (83%).

Reference: F. T. Ladipo, G. K. Anderson, Organometallics (1994) 13, 303.

Preparation of $Na[Ph_2PCHCPhO]$ 18.3 ml (18.3 mmol) of a 1.0 molar solution of sodium bis(trimethylsilyl)amide in THF are added dropwise at $-78°$ C. to a suspension of 5.57 g (18.3 mmol) of $Ph_2PCH_2CPhO$ in ether. After addition is complete, the mixture is warmed to room temperature and the resulting yellow solution is stirred for 12 hours. All volatile constituents are subsequently removed under reduced pressure. The residue is recrystallized from ether.

References: method similar to that of M. D. Fryzuk, X. Gao, S. J. Rettig, Can. J. Chem. (1995)73, 1175–80.

Preparation of $(TMEDA)Pd(Me)Cl$ 2.95 g (25.4 mmol) of TMEDA and subsequently 3.45 g (16.9 mmol) of iodobenzene are added to a solution of 9.72 g (16.9 mmol) of "$PD(DBA)_2$" in THF. The solution is stirred for 1 hour at 40° C., filtered through Celite and the filtrate is evaporated to dryness under reduced pressure. The resulting orange solid is washed with ether and dried under reduced pressure. Yield: 3.30 g (46%).

Reference: W. de Graf, J. van Wegen, J. Boersma, A. L. Spek, G. van Koten, Recl. Trav. Chim. Pays-Bas (1989) 108, 275.

| Abbreviations used: | |
|---|---|
| DBA = | dibenzylideneacetone |
| TMEDA = | tetramethylethylenediamine |
| COD = | cyclooctadiene |
| THF = | tetrahydrofuran |
| Me = | methyl |
| Ph = | phenyl |

B. Catalytic properties in polymerization

1. Norbornene polymerization

We have studied the catalytic activity of our palladium catalysts in the polymerization of norbornene at room temperature and at 80° C. The molar monomer/catalyst ratio was 1000–100 000:1. A comparable determination of the reaction conversions was carried out after reaction for one hour by precipitation in ethanol, isolation of the polymer, washing with ethanol, drying and weighing (Tables 1 to 5).

The complexes are made significantly more active by interaction with selected cocatalysts. While tris(pentafluorophenyl)borane displays only a moderate activating effect, $PdPh(Ph_2PCHCPhO)(Ph_3P)$ in combination with the acid $HB(C_6H_3(CF_3)_2)_4$ results in polymerization of 51% of the initially charged norbornene in one hour at 80° C. at M/K=1000. A considerable activity increase to 2.7 t of polymer per mol of Pd and hour is achieved using MAO as cocatalyst.

TABLE

| Ex. | Catalyst (mmol) | Cocatalyst (mmol) | Monomer (mmol) | Solvent (ml) | Temperature (° C.) | Polymerization time (h) | Yield (g/%) | Activity (t/mol*h) | TMA TGA |
|---|---|---|---|---|---|---|---|---|---|
| 1 | $PdPh(Ph_2PCHCPhO)(Ph_3PCH_2)$ 0.002 | MAO 2 | Norbornene 100 | Chlorobenzene 100 | 80 | 1 | 6.7/71.3 | 3.4 | TMA 254° C. TGA = 453° C. |
| 2 | $PdMe(Ph_2PCHCPhO)(Ph_3PCH_2)$ 0.002 | MAO 2 | Norbornene 100 | Chlorobenzene 100 | 80 | 1 | 7.0/74.5 | 3.5 | TMA 273° C. TGA = 450° C. |
| 3 | $PdPh(Ph_2PCHCPhO)(Ph_3P)$ 0.001 | MAO 1 | Norbornene 100 | Chlorobenzene 100 | 80 | 1 | 2.7/28.7 | 2.7 | TMA 267° C. TGA = 450° C. |
| 4 | $PdMe(Ph_2PCHCPhO)(Ph_3P)$ 0.001 | MAO 1 | Norbornene 100 | Chlorobenzene 100 | 80 | 1 | 2.5/26.6 | 2.5 | TMA 262° C. TGA = 455° C. |
| 5 | $PdMe(Ph_2PCHCPhO)(Ph_3PNH)$ 0.002 | MAO 2 | Norbornene 100 | Chlorobenzene 100 | 80 | 1 | 3.3/35.1 | 1.7 | TMA 268° C. TGA = 448° C. |
| 6 | $PdMe(Ph_2PCHCPhO)(C_5H_5N)$ 0.002 | MAO 2 | Norbornene 100 | Chlorobenzene 100 | 80 | 1 | 2.1/22.3 | 1.1 | TMA 268° C. TGA = 453° C. |

TMA = Thermomechanical analysis: softening point
TGA = Thermogravimetric analysis: decomposition temperature

What is claimed is:

1. Compounds of the formula

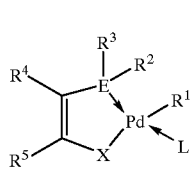

(I)

wherein

E is nitrogen, phosphorus, arsenic or antimony,

X is oxygen, $NR^1$ or sulphur, $R^1$, $R^2$, $R^3$ are, independently of one another, $C_1$–$C_{20}$-alkyl, $C_2$–$C_{30}$-alkenyl, $C_3$–$C_8$-cycloalkyl, $C_6$–$C_{12}$-aryl, $C_6$–$C_{12}$-ar-$C_1$–$C_{20}$-alkyl, $C_1$–$C_{20}$-alkyl-$C_6$–$C_{12}$-aryl, $C_1$–$C_{20}$-alkoxy, $C_6$–$C_{12}$-aryloxy, $C_1$–$C_{20}$-alkylamino, $C_6$–$C_{12}$-arylamino, or M-$SO_3$-$C_6$–$C_{12}$-aryl, and $R^1$ may also be hydrogen, $R^4$, $R^5$ are, independently of one another, hydrogen, $C_1$–$C_{20}$-alkyl, $C_2$–$C_{30}$-alkenyl, $C_3$–$C_8$-cycloalkyl, $C_6$–$C_{12}$-aryl, $C_6$–$C_{12}$-ar-$C_1$–$C_{20}$-alkyl, $C_1$–$C_{20}$-alkyl-$C_6$–$C_{12}$-aryl, chlorine, $OR^6$, $COOR^6$, $COOM$, $CONR^6_2$, $COR^6$, $SR^6$, $SO_2R^6$, $OSO_2R^6$, $P(O)(OR^6)_{2-y}R^7_y$, $CN$, $NHR^6$, $NR^6_2$, or $SO_3M$, $R^6$, $R^7$ are, independently of one another, hydrogen, $C_1$–$C_{20}$-alkyl, $C_2$–$C_{30}$-alkenyl, $C_3$–$C_8$-cycloalkyl, $C_6$–$C_{12}$-aryl, $C_6$–$C_{12}$-ar-$C_1$–$C_{20}$-alkyl, or $C_1$–$C_{20}$-alkyl-$C_6$–$C_{12}$-aryl, y is zero, 1 or 2, M is 1 cation equivalent of an alkali metal, ammonium, phosphonium, thallium, $(C_1$–$C_{20}$-alkyl$)_4$-ammonium, $(C_1$–$C_{20}$-alkyl$)_4$-phosphonium, $(C_1$–$C_{20}$-alkyl$)_{4-z}$ $(C_6$–$C_{12}$-aryl$)_z$-phosphonium, $(C_1$–$C_{20}$-alkyl$)_{4-z}$ $(C_6$–$C_{12}$-aryl$)_z$-ammonium, or ½ cation equivalent of an alkaline earth metal, L is selected from the group consisting of $R^8R^9R^{10}E^1$ Y, sulphoxides, sulphimides, and sulphur ylides, $E^1$ is as defined for E, $R^8$–$R^{10}$ are, independently of one another, hydrogen, $C_1$–$C_{20}$-alkyl, $C_2$–$C_{30}$alkenyl, $C_3$–$C_8$-cycloalkyl, $C_6$–$C_{12}$-aryl, $C_6C_{12}$-ar-$C_1$–$C_{20}$-alkyl, $C_1$–$C_{20}$-alkyl-$C_6$–$C_{12}$-aryl, or $OR^{11}$, $R^{11}$ is hydrogen $C_1$–$C_{20}$-alkyl, $C_2$–$C_{30}$-alkenyl, $C_3$–$C_8$-cycloalkyl, $C_6$–$C_{12}$-aryl, $C_6C_{12}$-ar-$C_1$–$C_{20}$-alkyl, or $C_1$–$C_{20}$-alkyl-$C_6$–$C_{12}$-aryl, Y is $R^{12}$, $R^{13}$ C, $R^{12}$ N, oxygen, sulphur, =C=C=O, =C=C=S, or =CPR$^1$R$^2$R$^3$, $R^{12}$, $R^{13}$ are, independently of one another, $C_1$–$C_{20}$-alkyl, $C_2$–$C_{30}$-alkenyl, $C_3$–$C_8$-cycloalkyl, $C_6$–$C_{12}$-aryl, $C_6C_{12}$-ar-$C_1$–$C_{20}$-alkyl, or $C_1$–$C_{20}$-alkyl-$C_6$–$C_{12}$-aryl, and z is zero or an integer from 1 to 4;

as initiators for the polymerization of ethylenically unsaturated compounds.

* * * * *